July 4, 1933.  J. W. BRYCE  1,916,962
SCALE
Filed Sept. 11, 1930    6 Sheets-Sheet 3

FIG. 4.

Inventor
J. W. Bryce
By his Attorney
W. M. Wilson

July 4, 1933.  J. W. BRYCE  1,916,962
SCALE
Filed Sept. 11, 1930  6 Sheets-Sheet 4

Inventor
J. W. Bryce
By his Attorney
W. M. Wilson

July 4, 1933.  J. W. BRYCE  1,916,962
SCALE
Filed Sept. 11, 1930  6 Sheets-Sheet 5

Inventor
J. W. Bryce
By his Attorney
W. M. Wilson

July 4, 1933.  J. W. BRYCE  1,916,962
SCALE
Filed Sept. 11, 1930    6 Sheets-Sheet 6

Inventor
J. W. Bryce
By his Attorney
W. M. Wilson

Patented July 4, 1933

1,916,962

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

SCALE

Application filed September 11, 1930. Serial No. 481,101.

The present invention relates generally to weighing scales and in particular to scales in which provisions are made for increasing the normal weighing capacity of the scale and also for compensating or offsetting the tare weight.

It is the primary object of the present invention to provide a novel means for offsetting or counter balancing the tare weight, that is, the weight of the container, by providing means for counter balancing a large number of tares with a relatively few weights which are combinationally controlled by suitable means such a series of cams.

Another object is to provide a novel means for visually indicating to the operator of the scale the value of the tare compensating weights set up in order to provide for a positive check on the correctness of the set up thereby reducing the chances of an incorrect setting.

A further object is to provide a novel means for increasing the weighing capacity beyond normal and indicating such increased capacity in both the front and the rear of the scale.

Further objects and various features or advantages of the present invention will be pointed out in the following specification and claims and shown in the accompanying drawings, which illustrate what may be considered, for the present at least, a preferred embodiment of the invention.

The scale mechanism rests upon a base 11 and is contained within a casing 12. The load platform 13 is mounted upon the usual base lever system contained within the base 11 and is connected by means of steelyard rod 14 to a lever 15 whose right end (Fig. 1) rests upon adjustable pivots carried by fixed uprights 16 mounted on the base 11. The extreme right end of lever 15 is connected by a metallic tape 17 to an eccentric cam 18 mounted upon a shaft 19 journaled upon pivot elements carried by the main frame 20.

The shaft 19 has integral therewith a pendulum weight 21 and a pendulum cam 22 which is operatively connected to a similar pendulum cam 23 by means of crossed metallic tapes. The pendulum cam 23 is integral with a shaft 24 which is journaled upon pivot elements carried by frame 20 and has integral therewith an arm 25 and a pendulum weight 26 similar to the pendulum weight 21. The foregoing mechanism is fully shown and described in Letters Patent No. 1,661,534, granted March 6, 1928 to W. N. Gilbert, therefore it need not be described in detail herein. It is sufficient to mention that the arm 25 is moved an angular distance proportional to the load upon the scale platform 13.

Pivoted to the free end of arm 25 is a draft rod 27 which extends upwardly through the interior of the scale into the casing 28 containing the rotatable drum 29 and is pivoted to a rack 30 meshing with a pinion 31 integral with the shaft 32 carrying the drum 29. It will be clear from the foregoing that the drum 29 will be turned a distance proportional to the load on the scale platform. The drum 29 is preferably provided with a translucent chart in order to permit light to pass through and is illuminated from the interior of the casing 28 by means of incandescent lamps 33 mounted upon the framework. It is desirable that the drum readings appear on both sides of the scale and for this reason the drum is provided with duplicate series of weight graduations. The series of graduations 34 and 35 represent the weight readings for the first 500 pounds, that is to say, the series 34 and 35 indicate from 0 to 500 pounds, the indications appearing simultaneously on both sides of the scale through front and rear openings 36, 37, respectively. Since the present invention provides for an increase in the weighing capacity there is provided a second duplicate series of graduations 38, 39 arranged to be read from the front and rear simultaneously. The series 38, 39 indicate weights ranging from 500 pounds to 1000 pounds, the 500 pound graduations being opposite the "0" graduations of the series 34, 35 while the 1000 pound graduations appear opposite the 500 pound graduations of series 34, 35. A shutter to be more fully described later herein, is arranged to permit reading of only one set of graduations on each side of the scale at a time.

Figure 6:
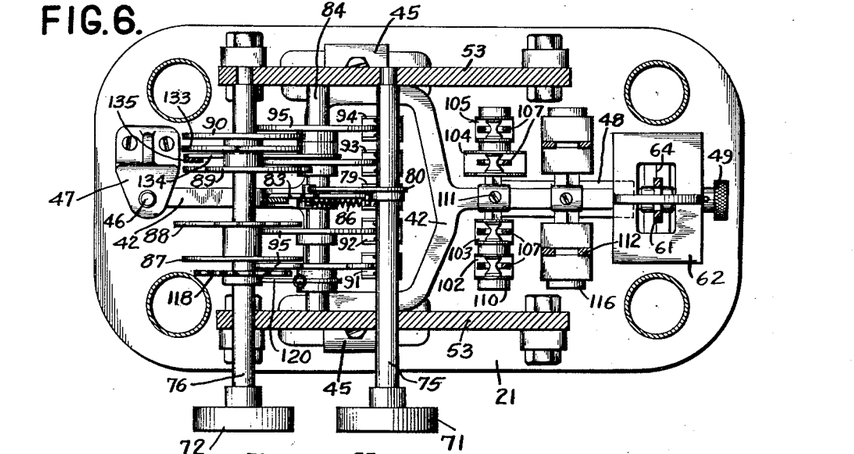
Fig. 6 is a horizontal section taken on the line 6—6 of Fig. 3 and illustrates the mechanism for manipulating the fractional tare compensating weight and the tare compensating weights which range in value from one to nine pounds.

The mechanism for manipulating the tare compensating weights and the capacity weight is contained within the portion of the casing 40 and intermediate the lower portion 12 and the drum casing 28. A link 41, pivotally connected to the lever 15 intermediate the points where the tape 17 and steelyard rod 14 are connected, is pivoted to a lever 42 supported upon pivot elements 43 carried by pivot elements 44 which are mounted upon vertical uprights 45 fixed in the main frame 20. A pair of adjustable stops 46, carried by a fixed bracket 47, cooperates with the left end of the lever 42 (Figs. 3 and 7) and serves to limit vertical movement of the lever 42 in either direction. Slidably mounted underneath the right end of lever 42 (Figs. 3, 6 and 7) is a compensating weight 48 arranged to be moved along the lever 42 from left to right (Fig. 7), or vice versa, by means of a thumb screw 49 rotatably mounted in lugs 50 carried by the lever 42. The weight 48 is used to place the scale lever system in balance and, after being properly adjusted during the process of sealing the scale, is locked in place by means of a set screw 51.

Figure 3:
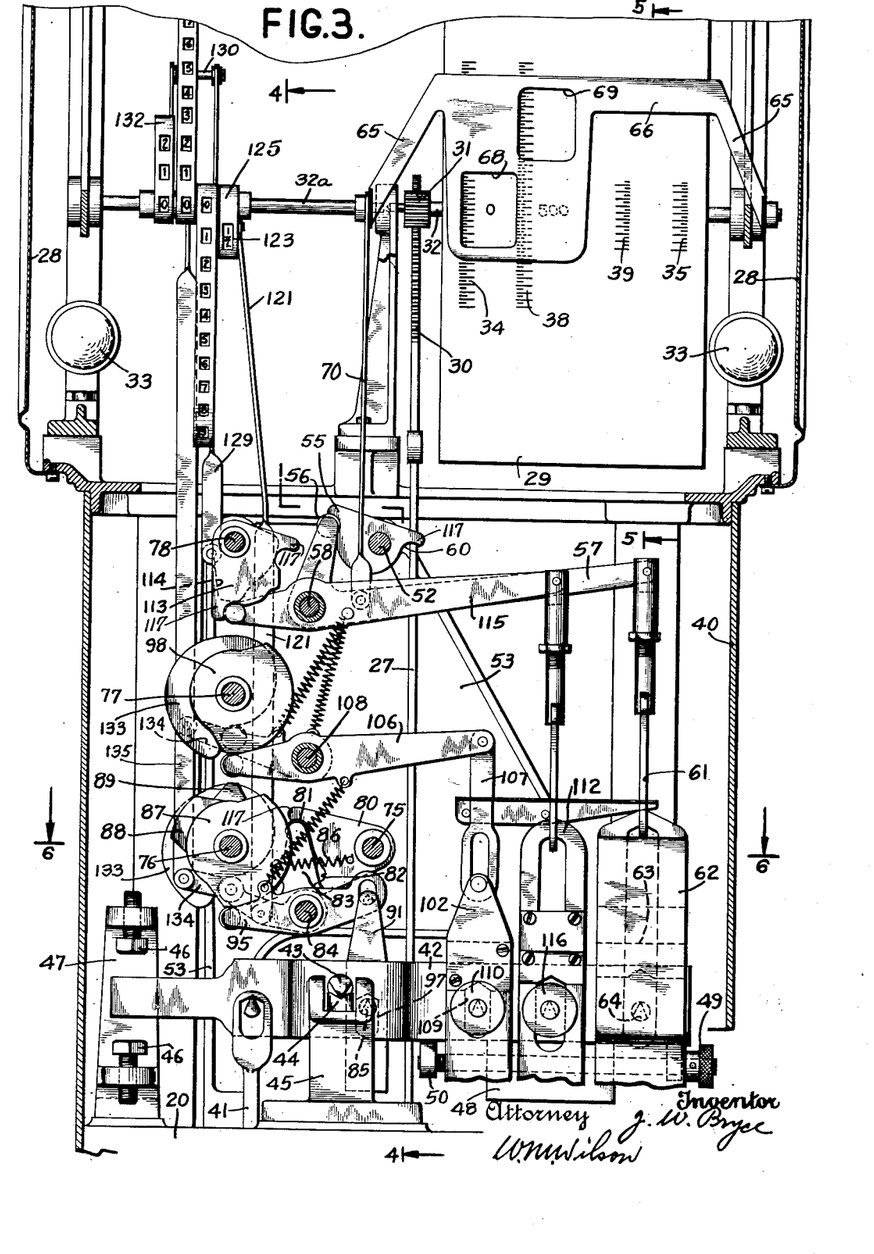
Fig. 3 is a front elevation of the middle portion of the scale shown in Fig. 1 with parts of the casing and frame removed and illustrates the mechanism for manipulating the tare compensating weights, the capacity weight, and the tare weight indicators.

The present invention has provisions for increasing the capacity of the scale whenever desired. The mechanism for accomplishing the desired result comprises a shaft 52 journaled in vertical frames 53 carried by the main frame 21 and extending through the cabinet 40, exterior of which the shaft 52 is provided with a knob 54 by means of which the shaft may be turned. Fixed upon the shaft 52 near its mid-point is a cam 55 having a cooperating roll 56 carried by one arm of a bell crank 57 loosely mounted upon a cross shaft 58 carried by the frames 53. The cam 55 has a high portion 59 and a low portion 60 each being slightly indented or depressed so as to hold the roll 56 yieldingly therein and require a slight effort to dislodge the roll from either of the depressions in which the roll may be resting. The other arm of the bell crank 57 has pivoted thereto a link 61 which in turn supports a weight 62 provided with a pivot element 63 arranged to cooperate with a pivot element 64 carried by the right end of lever 42 (Figs. 3 and 7).

Normally the roll 56 rests in the depression in the high portion 59 of cam 55 in which position the right end of the bell crank 57 is elevated thereby holding the weight 62 with the pivot element 63 away from the cooperating pivot element 64. The weight 62 is provided with a deep slot or recess 65 through which passes the lever 42 so proportioned that the lever is free to vibrate vertically under the influence of the load on the scale platform. While the weight 62 is in a normal or elevated position (Fig. 3) it has no effect upon the weighing system which is then capable of weighing loads up to 500 pounds.

Figure 7:
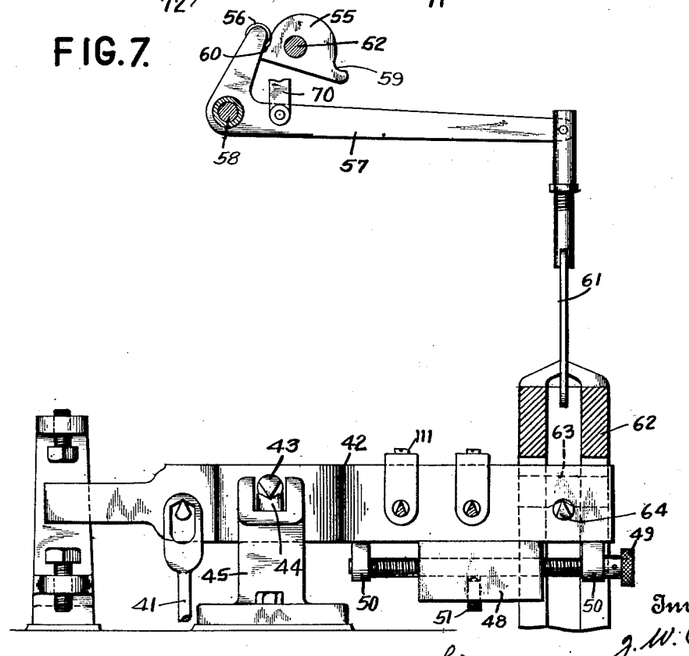
Fig. 7 is a detail view in elevation of the mechanism for manipulating the capacity weight.

The weighing capacity of the scale may be doubled whenever desired by grasping the knob 54 and turning it clockwise (Figs. 1 and 3) to the position shown in Fig. 7 in which the roll 56 rests in the depression in the low part of cam 55. In the latter position the weight 62 rests directly upon the lever 42 with pivot element 63 bearing on pivot element 64. The link 61 is slotted at its lower end and is pivoted to the bell crank 57 so that the weight 62 hangs freely upon the lever 42.

The weight 62 is of a magnitude sufficient to balance a load of 500 pounds placed on the scale platform so that the drum will not be disturbed from its zero position when the weight 62 is resting on the lever 42 unless a load greater than 500 pounds is placed on the platform of the scale.

It has been mentioned that weights over 500 pounds are indicated by means of a second pair of drum graduations 38, 39 so that it is apparent that confusion would result in reading the graduations on the drum 29 erroneously if both series of graduations 34, 38 or 35, 39 were visible at once, therefore shutter mechanism is provided to conceal the graduations 34, 35 while the graduations 38, 39 are visible and vice versa.

Journaled at their mid-points upon the shaft 32a, which is in alignment with shaft 32 supporting the drum 29, are two rock levers 65 having substantially cylindrical shutters 66, 67 supported therebetween which extend lengthwise of the drum behind the openings 36, 37 and between the drum 29 and the casing 28. The shutter 66 is provided with offset openings 68, 69 arranged to expose to view either the series of graduations 34 or the series 38. A similar pair of openings is provided in the shutter 67 arranged to expose the series of graduations 35 while the series 34 is visible through opening 68 and render the series 39 visible while the series 38 is visible through opening 69. The right lever 65 (Fig. 3) has pivoted thereto a link 70 which is pivoted to the bell crank 57. Whenever the knob 54 is turned to lower the weight 62 and allow it to drop on the lever 42 the link 70 will be drawn downwardly, depressing shutter 66 and elevating shutter 67 thereby exposing the graduations 38, 39 and obscuring the graduations 34, 35.

The present invention provides a novel mechanism for compensating for the tare weight of a load upon the scale platform, that is to say, means is provided for releasing various combinations of weights which affect the weighing system in a manner to neutralize the weight of the container for the article or material placed upon the scale platform. This mechanism comprises a series of four knobs 71, 72, 73 and 74 fast upon shafts 75, 76, 77 and 78, respectively. By manipulating the knobs 71 to 74 any tare weight from a half pound to 299½ pounds may be set up accurately to within a half pound. This result is accomplished by means of mechanism somewhat similar in principle to the mechanism for controlling the capacity weight 62.

The shaft 75 is arranged to control a weight 79 which is of a value sufficient to counterbalance a weight of a half pound on the scale platform and is lowered by means of a cam 80 fast upon shaft 75. The cam 80 is provided with a high point 81 and a low point 82 and is arranged to cooperate with an anti-friction roller on one arm of a bell crank 83 loosely mounted upon a cross rod 84 carried by the frames 53. The other arm of bell crank 83 has a pin and slot connection with the weight 79 which normally hangs freely on the right arm of the bell crank. The weight 79 has a pivot element arranged to cooperate with a pivot element 85 mounted upon the lever 42 which is yoke shaped (Fig. 6) and supports the pivot element 85 between the two branches of the yoke. The pivot element 85 passes through a large opening in the weight 79 and has a knife edge adapted to bear in a notch in the upper portion of the opening formed in the weight 79. A spring 86, interposed between a pin carried by cam 80 and the arm of bell crank 83 carrying the anti-friction roller, holds the roller firmly in the depression formed in either the high point 81, as in Fig. 3, or in the depression formed in the low point 82. In the former position the weight 79 has no effect on the lever system while in the latter position it counterbalances a load of exactly a half pound on the scale platform. It will be clear that a partial turn clockwise of knob 71 and shaft 75 (Fig. 3) will cause the weight 79 to be lowered until it rests freely upon the lever 42.

The shaft 76 controls the tare compensating weights which range from one to nine pounds and is arranged to drop weights upon the lever 42 by increments equivalent to one pound each time the shaft is turned an increment of one-tenth of a revolution. To accomplish this result four cams 87, 88, 89 and 90 are arranged to control corresponding weights 91, 92, 93 and 94. Each of the cams 87 to 90, inclusive, has a coacting rock arm 95 having an anti-friction roller resting on the cam and provided with a spring 96 which holds the roller against the cam.

Each of the weights 91 to 94, inclusive, has a pin and slot connection to its corresponding rock arm 95 which permits the weight to rest on the pivot element 85 whenever the anti-friction roller rides off a high point in the cam into a low point.

Figure 9:
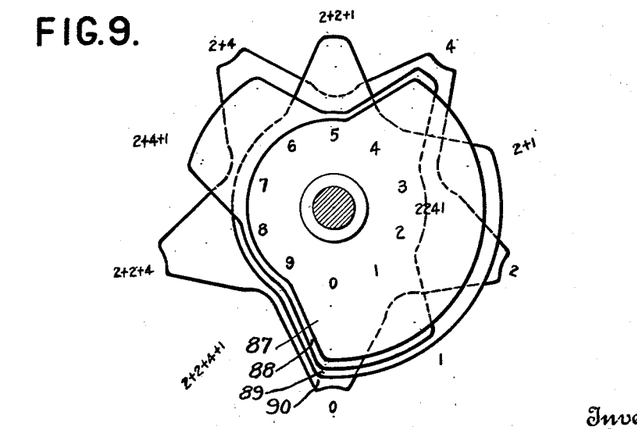
Fig. 9 is a series of superimposed diagrams illustrating the development of the cams used to manipulate the tare compensating weights.

The weights 91 to 94 inclusive are of such magnitude that various combinations of the four, when dropped upon the lever 42, counterbalance tare weights of 1, 2, 3, 4, 5, 6, 7, 8, and 9 pounds, respectively. This result is accomplished by making the weights 91 and 92 equivalent to two pounds, the weight 93 to four pounds, while the weight 94 is made equivalent to one pound. The high and low points of the cams 87 to 90, inclusive, are so disposed that the weights 91 to 94 are lowered either singly or in groups to give the proper combination of weights for each desired tare weight. Fig. 9 illustrates a series of cams in profile and shows how the high and low points are disposed to secure the desired combinations. It will be noted that it is necessary to lower all four weights to counterbalance a tare weight of nine pounds, for instance, while the lowering of the four pound weight by cam 89 and the two pound weight by cam 87 counterbalances a tare weight of six pounds. Each of the weights 91 to 94 is provided with an opening 97 (Fig. 3) through which passes the pivot element 85, these openings being identical in size and shape with the opening in the half pound weight 79 and similarly provided with a notch in which the knife edge of the pivot element 85 bears when the weight rests upon the pivot element. The pin and slot connections of the arms 95 to the various weights permits the weights to hang perfectly free when dropped on the lever 42 and prevents error due to an otherwise possible shifting of the center of gravity of the lever system.

A substantially similar system to that just described is provided to offset or balance tare weights ranging from ten to ninety pounds. Since the mechanism is identical in construction to the mechanism for manipulating the one to nine pound weights already described, the former will be only briefly described herein as it will be readily understood without a detailed description.

The shaft 77 carries cams 98, 99, 100, and 101, arranged to control weights 102, 103, 104 and 105, through the medium of rock arms 106 operated by the cams. The rock arms 106 support the weights 102 to 105, inclusive, by means of links 107 having a pin and slot connection to the weights, and are mounted upon a shaft 108 similar to the shaft 84. In order to reduce the number of springs necessary, the springs 96 are attached to the right arms of rock arms 106 and to the left arms of rock arm 95 thereby serving a double purpose. The weights 102 and 103 are each equivalent to twenty pounds on the scale platform while the weights 104 and 105 are equivalent to forty pounds and ten pounds, respectively. The profile of the cams 98 to 101, inclusive, is identical with the profile of cams 87 to 90, inclusive, and they control the weights 102 to 105 in exactly the same manner, the only difference being that the weights 102 to 105 are ten times as effective as the weights 91 to 94. Each of the weights 102 to 105, inclusive, has an opening 109 similar to the opening 97 but on a larger scale and when dropped upon the lever 42 rests freely upon a pivot element 110 attached to the lever 42 by means of a screw 111, the knife edges of the pivot element 110 bearing in a coacting notch in the opening 109.

The topmost shaft 78 is arranged to control two weights 112 each equivalent to one hundred pounds. Accordingly, the shaft 77 is provided with two cams 113 and 114 having cooperating spring urged rock arms 115 from which the weights 112 are suspended. The rock arms 115 are journaled upon shaft 58 and, when rocked clockwise under the influence of cams 113, 114 (Fig. 3) permit the weights 112 to rest upon the knife edges of a pivot element 116 similar to the pivot element 110. The cams 113, 114 have their high and low points so disposed that in one position both weights 112 are raised, in a second position one weight is raised and the other lowered upon lever 42, while in a third position both weights are lowered upon lever 42, thereby maikng it possible to counterbalance tare weights of 100 pounds and 200 pounds on the scale platform.

It is desirable that means be provided for holding the shafts 54 and 71 to 74, respectively, yieldingly in set position so that once set manually they will remain so set and properly aligned. The shafts 54 are held in their displaced positions owing to the depressions in the high and low points 59, 60 of cam 55 and 81, 82 of cam 80 into which the anti-friction rollers 56 and 81 snap when the shafts are turned to either limit of travel. The cam 113 is provided with similar depressions in the high, intermediate, and low points into which the roller carried by one of the arms 115 snaps. The cam 114 is a simple disk cam like the cam 87, for instance. Each of the cams 55, 80 and 114 is provided with abutments as shown at 117 on cam 113 for the purpose of limiting rotation of the cams, the abutments 117 striking the cam rollers and preventing overtravel.

Figure 10:
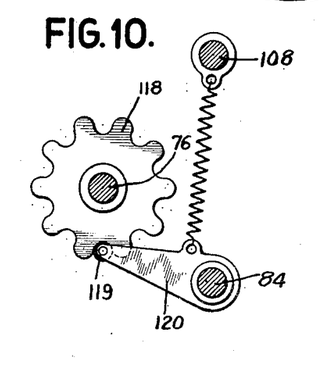
Fig. 10 is a detail view illustrating an arrangement for holding in set position the shafts for manipulating the tare compensating weights ranging from one to nine pounds and from ten to ninety pounds respectively.

The shafts 76 and 77 are each provided with an aligning disk 118, as shown in Fig. 10, with which cooperate anti-friction rollers 119 carried by spring pressed arms 120 loosely mounted upon shafts 84 and 108, respectively. It will be obvious that this construction yieldingly holds the shafts 76, 77 in each of their set positions and at the same time permits the shafts to be turned readily.

There is also provided mechanism for giving a visual indication of the adjusted condition of the knobs 71 to 74 so that the operator may know what tare weight will be compensated or balanced. Pivoted to a third arm of lever 83 is a link 121 which extends upwardly into the drum casing and is pivoted therein to an arm 122 rigidly mounted upon shaft 32a and carrying an indicator 123 bearing the fraction "½" thereon. When the half-pound weight 79 is resting on the beam 42 the numerals on the indicator 123 are visible through an opening 124 formed in the casing 28. When the weight 79 is raised a blank portion 125 is visible at the opening. An arm 126, similar to arm 122 and also fast on shaft 32a is provided with an indicator 127 similar to indicator 123 and also bearing the fraction "½" thereon arranged to be visible through an opening 128 in the opposite side of the casing 28.

Figure 4:
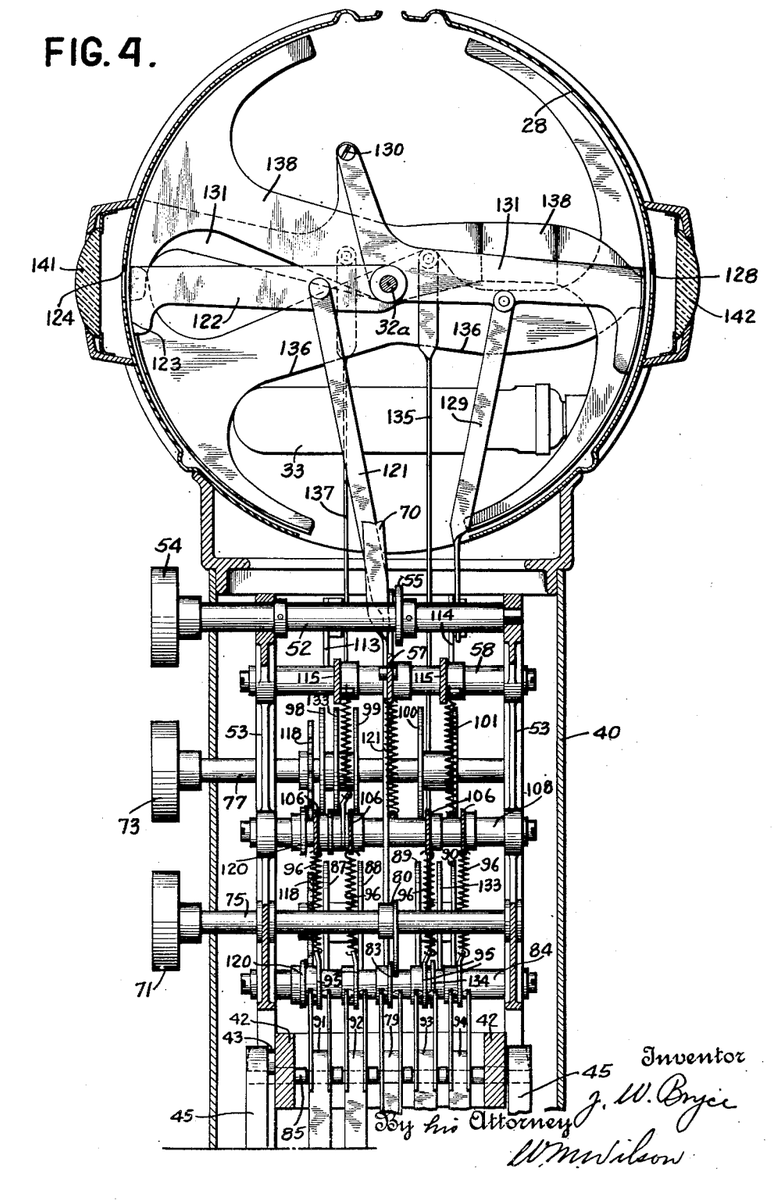
Fig. 4 is a vertical section taken on the line 4—4 of Fig. 3.
Figure 5:
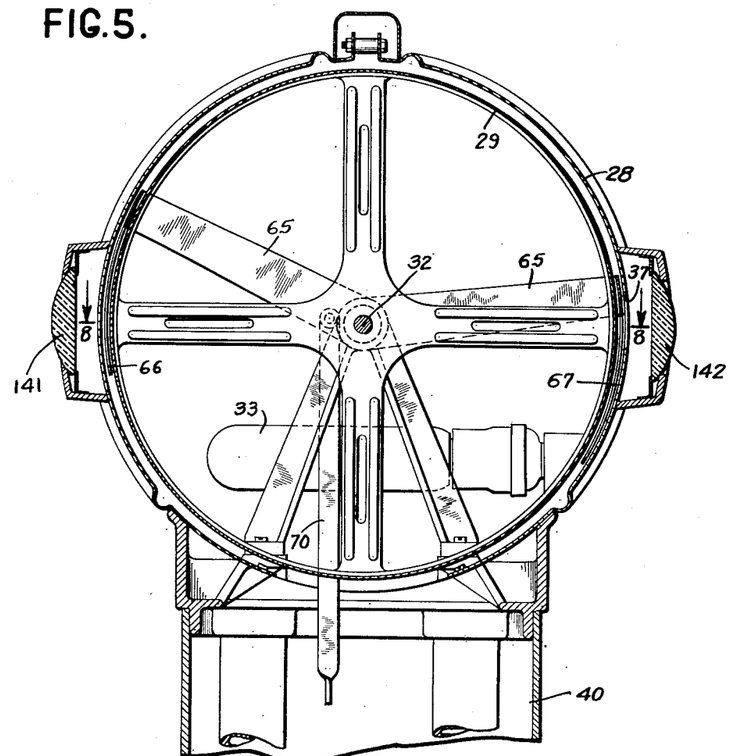
Fig. 5 is a vertical section taken on the line 5—5 of Fig. 3 and illustrates the construction of the shutter mechanism for concealing portions of the drum.

A link 129 is pivoted to an ear formed in cam 114 and also to a bail 130 loosely mounted upon shaft 32a. The arms supporting and forming part of bail 130 are provided with extensions 131 projecting to the left and right (Fig. 4) and have indicators 132 thereon bearing the numerals "0", "1" and "2". When both weights 112 are raised the numeral "0" appears in openings 124 and 128 while the numerals "1" or "2" appear when one or both of said weights have been dropped on lever 42.

Mounted upon each of the shafts 76, 77 is a snail cam 133 cooperating with rollers carried by spring pressed arms 134 loosely mounted upon the shafts 84 and 108 respectively. The arm 134 associated with shaft 76 has pivoted thereto a link 135 pivoted at its upper end to an indicator 136, loosely mounted on shaft 32a, having two sets of numerals ranging from "0" to "9" thereon and arranged to be viewed through the openings 124 and 128. A similar link 137, pivoted to the arm 134 associated with the shaft 77, is pivoted to an indicator 138 similar to the indicator 136. The snail cams 133 are so constructed that the indicators 136, 138 will be set to give a corresponding visual indication of the value of the combinations of weights dropped upon the lever 42.

Figures 1, 2:
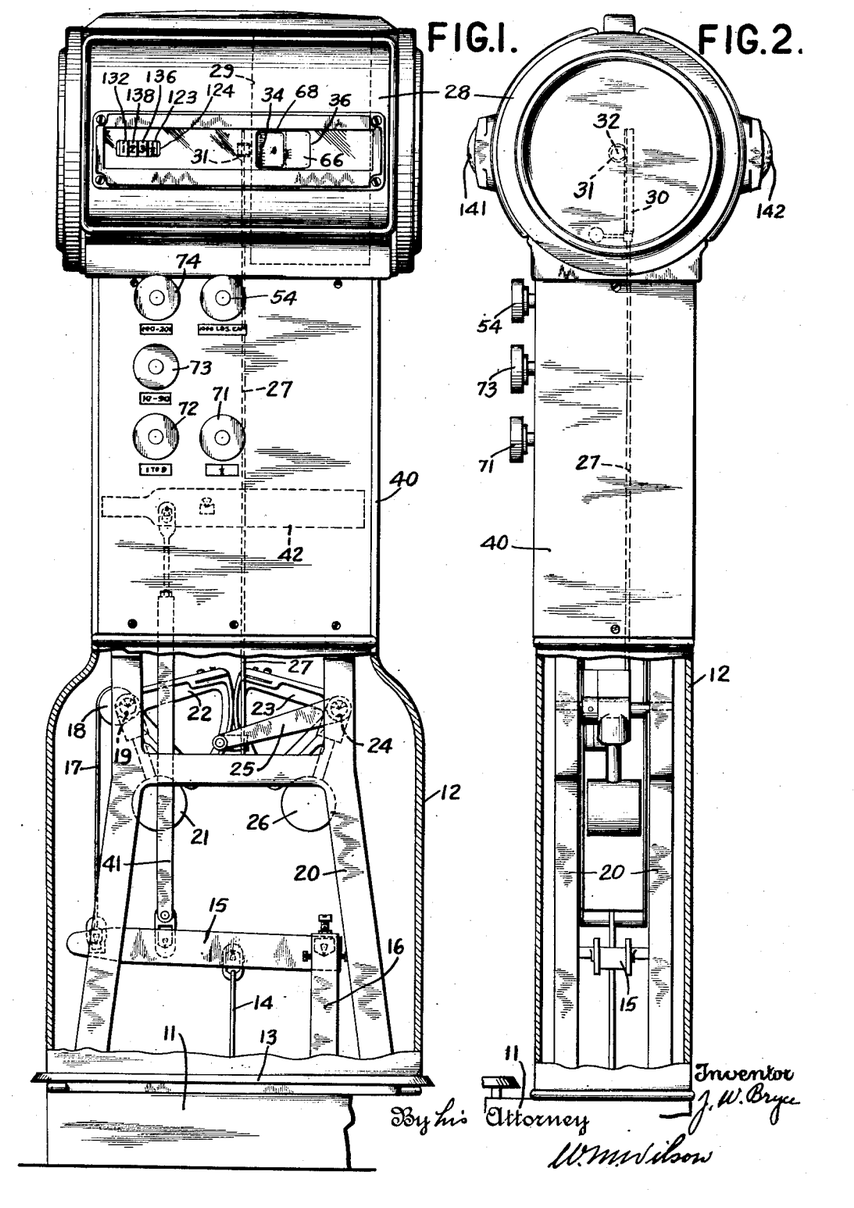
Fig. 1 is a front elevation illustrating the exterior appearance of a scale embodying the present invention, portions of the casing having been broken away to expose the interior.
Fig. 2 is a side elevation of the scale illustrated in Fig. 1.

It will be assumed that a container full of material to be weighed is placed upon the scale platform and that the container weighs 123½ pounds. The knob 54 is not disturbed because in the present case it will be assumed that the material weighs less than 500 pounds. The knob 71 is grasped and turned clockwise thereby dropping weight 79 upon lever 42 and raising link 121 thereby bringing the fraction "½" into view through both openings 124, 128. The knob 72 is then grasped and turned until a "3" appears in the opening 124 directly to the left of the fraction "½", the turning of shaft 76 in this fashion causing weights 92 and 94 to be dropped upon lever 42. Next the knob 73 is turned in a similar manner until a "2" appears in opening 124 directly to the left of the "3", this operation allowing the weight 103 to drop on the lever 42. The final step is the turning of knob 74 until a one appears in opening 124 to the left of the "2" already visible and causes one of the weights 112 to drop on the lever 42. The number "123½" will now be visible through the opening 124, as illustrated in Fig. 1, and will also appear in the opening 128 on the opposite side of the scale. This represents a tare weight of 123½ pounds and denotes the fact that the weight of the container has been balanced or offset by the combination of weights dropped upon the lever 42.

The weight of the material in the container will now be indicated correctly through the openings 68 in shutters 66, 67 and will appear on both sides of the scale simultaneously.

If it should happen that the weight of material being weighed is in excess of 500 pounds, as would be indicated if the drum turned through more than a complete revolution, it is merely necessary to turn the knob 54 as far as it will go thereby lowering the shutter 66 and raising shutter 67 to render the graduations 38, 39 visible through openings 69, at the same time allowing the weight 62 to drop on lever 42. The drum 29 will now swing backwardly and indicate the true weight through openings 69 on both sides of the scale.

Figure 8:
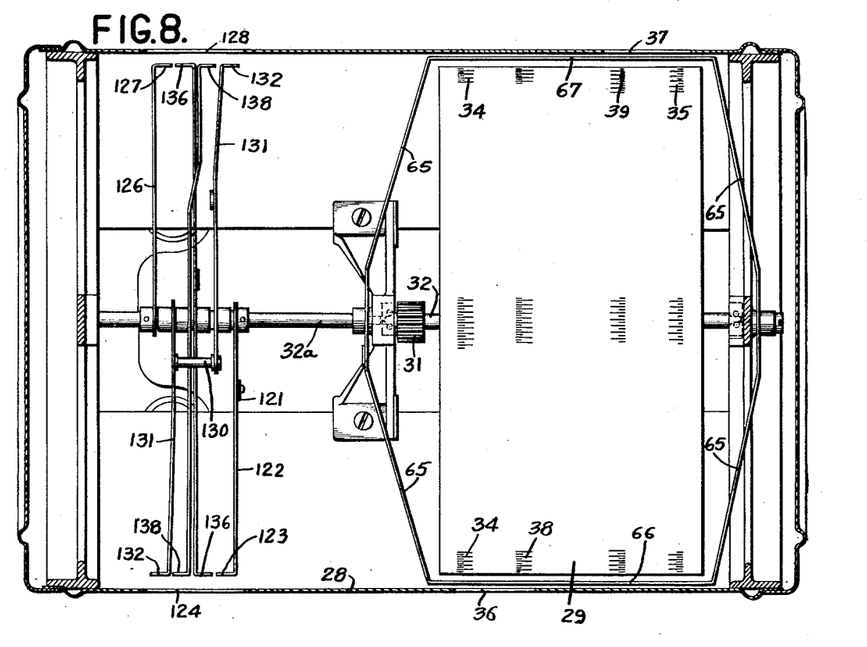
Fig. 8 is a horizontal section taken substantially on the line 8—8 of Fig. 5 and illustrates the construction of the tare weight indicators and the shutter mechanism for the drum.
Figure 11:
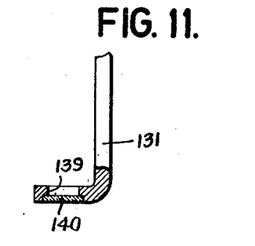
Fig. 11 is a detail view in section showing the construction of the transparent tare weight indicators.

It may be desired to increase the visibility of the numerals indicating the tare weight, therefore, the indicators representing the tare weight are substantially flanged as shown in Figs. 8 and 11 and are provided with recesses or openings 139 in which are set small transparent inserts 140 bearing the desired numerals thereon. It will be clear that light from the lamps 33 will pass through the inserts 140 which happen to be opposite the openings 124, 128 and outline sharply the figures on said inserts, thereby making it easy to read the tare weight. There is also provided means for enlarging the indications visible through openings 124, 128 and 36, 37 comprising two cylindrical lenses 141, 142, extending across the front openings 36, 124 and the rear openings 37, 128 respectively.

One of the important features of the present invention is the novel arrangement whereby only four weights controlled by four cams are needed to secure nine combinations of tare compensating weights. It is obvious, of course, that by adding one or more cams and coacting weights to any or all of the four shafts 71 to 74, inclusive, a greater number of combinations of weights could be secured without requiring a large increase in the number of weights. For instance, if a fifth cam and a coacting fifth weight of, let us say, three pounds were added to the lower shaft 72, combinations of weights ranging from one to twelve pounds may be secured by means of the five weights. By making the five weights equivalent in value to a series of tares ranging from one to five pounds a still greater range of weights from one to fifteen pounds may be secured, and so on.

The foregoing arrangement might also be used to compensate for tare weights ranging from one to fifteen ounces by providing shaft 71 with five cams and five sets of coacting weights ranging in value progressively from one to five ounces.

Another of the novel features is the duplicate indications of both tare weight and weight of material in the container which enables a merchant and his customer to read the weight indications simultaneously.

The simplicity of operation and the relief from the need of using mental arithmetic to arrive at the correct weight constitutes a decided advantage of the present invention, both in the time saved thereby and convenience to the user of the scale.

The present invention, for sake of convenience in description and to assist in a clear understanding of the principles involved, has been shown as applied in a specific form, however, it is not desired to limit the invention to the precise form of embodiment shown and described as it is capable of being used in various forms, all falling within the scope of the claims which follow.

I claim:

1. In a scale, weighing mechanism, an indicating mechanism controlled thereby having a plurality of indications thereon proportional to weight, certain of said indications representing in duplicate both front and rear of said scale the normal capacity of said scale, the others representing in duplicate an excess capacity, means for increasing the capacity of said mechanism beyond the normal capacity, and means controlled by said last named means for obscuring said duplicate normal capacity indications and exposing said duplicate excess capacity indications whenever said first named means is effective.

2. In a scale, the combination of a weighing system including a weight indicator controlled thereby and having duplicate portions thereof arranged to indicate the normal weighing capacity of said system and duplicate portions for indicating an excess capacity, normally ineffective means for increasing the weighing capacity of said system, means normally exposing to view said first named duplicate portions and obscuring said second named portions, and means for rendering effective said capacity increasing means and reversing the condition of said second named means thereby obscuring said first named portions and exposing to view said second named portions.

3. In a scale, the combination of a weighing system, an indicator controlled thereby and having a plurality of series of graduations in duplicate and proportional to weight, whereby readings may be taken from the front and rear of said scale, one of said series representing the normal capacity of said system, the other series representing additional capacity, shutter mechanism for normally obscuring all of said series except the first named duplicate series, means for increasing the capacity of said system beyond the normal capacity, and manipulative means for controlling said capacity increasing means and operating said shutter to obscure said first named duplicate series of graduations and expose to view said second named duplicate series simultaneously both front and rear of said scale.

4. In a scale, the combination of weighing mechanism, a drum controlled thereby and having two series of duplicated weight indications arranged side by side about the periphery of said drum, one series of said duplicated weight indications representing the normal capacity of said weighing mechanism and the other series an additional capacity, the lower limit of each of said excess capacity series corresponding in magnitude to the upper limit of the corresponding normal capacity series and arranged in alignment with the lower limit of said normal capacity series, a shutter normally exposing to view the duplicated normal capacity series and obscuring the duplicated excess capacity series, said shutter being shiftable to expose said excess capacity series and obscure said normal capacity series, means for increasing the capacity of said weighing mechanism, and means for controlling said last mentioned means and shifting said shutter.

5. A scale according to claim 4 in which said shutter comprises two cylindrical members having two pairs of openings, the openings of each pair being displaced from each other both circumferentially and in an axial direction.

6. In a scale, the combination of weighing mechanism, a plurality of tare compensating members adapted to be connected to the weighing mechanism to offset tares, said members being arranged in denominational groups, each group being adapted to counterbalance a number of different tares greater than the number of compensating members in the group; operating mechanism for connecting the members of each group to the weighing mechanism both singly and in different combinations to offset the different tares, including a series of manipulative devices each of said devices being arranged to operate both singly and in combination all the members of a denominational group; and means differentially controlled by said device for indicating on opposite sides of the scale the total value of the compensating members connected to the weighing mechanism.

7. In a scale, the combination of weighing mechanism, a member operatively connected therewith, a plurality of tare compensators adapted to be applied to said member, said tare compensators comprising a plurality of groups of four weights, each group having values assigned thereto sufficient to counterbalance nine possible tares with each group, means for applying said compensators to said member singly or in combination and means for indicating the total value of the tare compensators by said members.

8. In a scale, the combination of a load support, a member operatively connected therewith, a plurality of denominational groups of load offsetting devices adapted to be applied to said member; means including a series of denominational manipulative devices for applying said devices to said member both singly or in different combinations, each manipulative device being settable to different values and controlling one group of devices; and indicating means controlled by movement of the manipulative devices and comprising load indicators for denominationally indicating on both sides of the scale the load offset by the devices applied to said member 9. A scale for weighing the contents of a container comprising a load support for said container and its contents, denominational groups of members associated with the load support for compensating the weight of the container, manual elements each for actuating a denominational group of compensating members, the manual elements and their associated members being operative in combinations, means for indicating denominationally the weight of the container, means also associated with said support for counterbalancing the weight of the contents, and automatic indicating means controlled by the last named means and adapted to indicate the weights of the contents in line with the denominationally indicated weight of the container.

10. In a scale, the combination of weighing mechanism, a member operatively connected therewith, a plurality of tare compensators adapted to be applied to said member, means including a series of manipulative members for applying said compensators to said member singly or in combination, and means comprising a plurality of tare indicators for indicating on both sides of the scale the total value of the tare compensators applied to said member.

11. In a scale, weighing mechanism, an internally illuminated indicator actuated by said mechanism to indicate amounts in proportion to weight, tare compensating mechanism, and indicating mechanism actuated by the tare compensating mechanism comprising indicators adapted to indicate the tare in alignment with the amount indicated by the first named indicator, said indicators having opaque indicia representing tares and formed on a background transmitting light whereby to permit illumination of the tare conjointly with the first named indicator.

12. In a scale, weighing mechanism, a translucent drum indicator rotated by the weighing mechanism to indicate amounts proportional to weight, tare compensating mechanism operatively associated with the weighing mechanism to offset tares; tare indicating mechanism actuated by the tare compensating mechanism including a plurality of tare indicators mounted co-axially of the drum indicator and arranged to indicate tares in alignment with amounts indicated by the first named indicator, said indicators being provided with indicia representing tares and formed on a background transmitting light; and means for illuminating the amounts indicated by both the first named indicator and the tare indicators by light transmitted through said drum and background respectively.

13. In a scale, weighing mechanism, a translucent indicator actuated by the weighing mechanism and provided with indicia proportional to weight, auxiliary load offsetting mechanism connected to the weighing mechanism; an indicator actuated by the auxiliary mechanism and adapted to indicate the amount of the load offset by the auxiliary mechanism and in alignment with amounts indicated by the first named indicator, said second named indicator having its load indicating indicia on a background transmitting light; and means for illuminating the indicia on both indicators by transmitted light.

14. In a scale for weighing loads, weighing mechanism, indicating means actuated by the weighing mechanism and adapted to indicate amounts proportional to weight, auxiliary mechanism connected to the weighing mechanism including load offsetting devices and means for applying said devices to offset a portion of the load, and an auxiliary indicator settable by the auxiliary means and adapted to indicate the portion of the load offset in alignment with the amount indicated by the first named means, said auxiliary indicator comprising a rotatably mounted element differentially set by the auxiliary means and having a flange provided with a series of openings one for each value of the range of values within which the indicator may be set to indicate, said openings having inserted therein elements capable of transmitting light and bearing relatively opaque characters representative of the various values within the range of values which may be indicated; and a light source adapted to project light through said inserts to permit the characters thereon to be read.

In testimony whereof I hereto affix my signature.

JAMES W. BRYCE.